(12) United States Patent
Mikoshiba et al.

(10) Patent No.: US 11,040,278 B2
(45) Date of Patent: Jun. 22, 2021

(54) SERVER DEVICE DISTRIBUTING VIDEO DATA AND REPLAY DATA AND STORAGE MEDIUM USED IN SAME

(71) Applicant: KONAMI DIGITAL ENTERTAINMENT CO., LTD., Tokyo (JP)

(72) Inventors: Eiri Mikoshiba, Tokyo (JP); Kenichi Arai, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 0 days.

(21) Appl. No.: 16/570,240

(22) Filed: Sep. 13, 2019

(65) Prior Publication Data

US 2020/0001178 A1 Jan. 2, 2020

Related U.S. Application Data

(63) Continuation of application No. PCT/JP2018/008316, filed on Mar. 5, 2018.

(30) Foreign Application Priority Data

Mar. 15, 2017 (JP) .............................. JP2017-049996

(51) Int. Cl.
*A63F 13/35* (2014.01)
*A63F 13/497* (2014.01)
*A63F 13/95* (2014.01)

(52) U.S. Cl.
CPC ............ *A63F 13/35* (2014.09); *A63F 13/497* (2014.09); *A63F 13/95* (2014.09)

(58) Field of Classification Search
CPC ...... A63F 13/355; A63F 13/86; A63F 13/335; A63F 13/497; A63F 13/35; A63F 13/95
See application file for complete search history.

(56) References Cited

U.S. PATENT DOCUMENTS 5,558,339 A * 9/1996 Perlman .................. A63F 13/12
463/42
5,779,548 A * 7/1998 Asai ........................ A63F 13/10
463/31

(Continued)

FOREIGN PATENT DOCUMENTS

| JP | 2009-247563 A | 10/2009 |
| JP | 2015-13102 A | 1/2015 |
| JP | 2015-198404 A | 11/2015 |

OTHER PUBLICATIONS

Communication of Notice of Reason for Refusal dated Jul. 18, 2017, from the Japanese Patent Office in counterpart Application No. 2017-049996.

(Continued)

*Primary Examiner* — Steve Rowland
(74) *Attorney, Agent, or Firm* — Sughrue Mion, PLLC (57) ABSTRACT

Provided is a server device that makes it possible to suitably distribute both video data and replay data. A center server distributes at least part of server data to a user terminal connected via a network. When the user terminal functions as a game terminal, the server center acquires replay data for reproducing past play from the user terminal so that the replay data functions as the server data and, when the server data includes video data and the user terminal functions as a video display terminal, updates the video data so that game video corresponding to the past play is displayed. The center server determines data to be distributed in accordance with the type of user terminal so that replay data is distributed to the user terminal when functioning as a game terminal and video data is distributed to the user terminal when functioning as a video display terminal.

5 Claims, 8 Drawing Sheets

(56) References Cited

U.S. PATENT DOCUMENTS

| | | | |
|---|---|---|---|
| 2002/0015040 A1* | 2/2002 | Takatsuka | G06T 15/20 |
| | | | 345/427 |
| 2009/0125967 A1* | 5/2009 | Perlman | H04N 7/17318 |
| | | | 725/133 |
| 2010/0160040 A1* | 6/2010 | Ikeda | A63F 13/5255 |
| | | | 463/31 |
| 2010/0167816 A1* | 7/2010 | Perlman | H04N 19/132 |
| | | | 463/30 |
| 2011/0281645 A1* | 11/2011 | Wolfson | A63F 13/86 |
| | | | 463/31 |
| 2012/0100910 A1* | 4/2012 | Eichorn | H04N 21/43615 |
| | | | 463/31 |
| 2014/0179439 A1* | 6/2014 | Miura | A63F 13/73 |
| | | | 463/42 |
| 2016/0158656 A1* | 6/2016 | Condrey | A63F 13/63 |
| | | | 463/31 |
| 2017/0157512 A1* | 6/2017 | Long | A63F 13/86 |
| 2017/0249785 A1* | 8/2017 | Hooper | A63F 13/335 |

OTHER PUBLICATIONS

Communication for Decision to Grant a Patent dated Nov. 20, 2017, from the Japanese Patent Office in counterpart Application No. 2017-049996.

International Search Report in International Application No. PCT/JP2018/008316, dated May 29, 2018.

Written Opinion in International Application No. PCT/JP2018/008316, dated May 29, 2018.

Communication dated Feb. 15, 2021 from the Korean Property Intellectual Office in Application No. 10-2019-7027273.

YouTube Customer Center, Dec. 29, 2016.

\* cited by examiner

SERVER DEVICE DISTRIBUTING VIDEO DATA AND REPLAY DATA AND STORAGE MEDIUM USED IN SAME

TECHNICAL FIELD

The present invention relates to a server device that includes a data storage unit which stores data for distribution to be distributed to a requesting terminal connected via a network, and that distributes the data for distribution to the requesting terminal according to a request from the requesting terminal, and so on.

BACKGROUND ART

Server devices exist that include data storage unit which store data for distribution to be distributed to a requesting terminal connected via a network, and that, in response to a request from the requesting terminal, distribute the data for distribution to the requesting terminal. For example an information processing system is per se known in which, as such data for distribution and a requesting terminal, video data for displaying video and a game terminal providing a game are employed respectively (for example, refer to Patent Document #1).

CITATION LIST

Patent Literature

Patent Document #1: JP2015-198404A.

SUMMARY OF INVENTION

Technical Problem

With the system of Patent Document #1, sometimes video data of video in which the playing of a game has been recorded is also distributed. However, replay data for reproducing past play is not distributed. Due to this there is a possibility that, with only this type of video, it will not be possible to convey appeal of the game sufficiently.

Accordingly, it is an objective of the present invention to provide a server device and so on, capable of suitably distributing both video data and replay data.

Solution to Technical Problem

The server device of the present invention is a server device that comprises a computer having a data storage unit storing data for distribution to be distributed to a requesting terminal connected via a network, and that distributes the data for distribution to the requesting terminal in response to a request from the requesting terminal, and wherein the computer serves as: a data acquisition unit that, when the requesting terminal includes a game terminal that provides a game, acquires from the game terminal replay data for reproducing past play of the game upon the game terminal, so that the replay data functions as the data for distribution; a data updating unit that, when the requesting terminal includes a video display terminal that is employed for displaying videos so that the video data for displaying the videos functions as the data for distribution, updates the video data so as to include game video data for displaying a game video corresponding to the past play; and a subject determination unit that determines a subject for distribution from among the replay data and the video data in accordance with the type of the requesting terminal, so that the replay data is distributed to the game terminal and the video data is distributed to the video display terminal, respectively.

On the other hand, the non-transitory computer readable storage medium of the present invention is a non-transitory computer readable storage medium storing a computer program that is adapted to cause the computer comprising the data storage unit to function as units of the server device described above.

DESCRIPTION OF EMBODIMENTS

Figure 1:
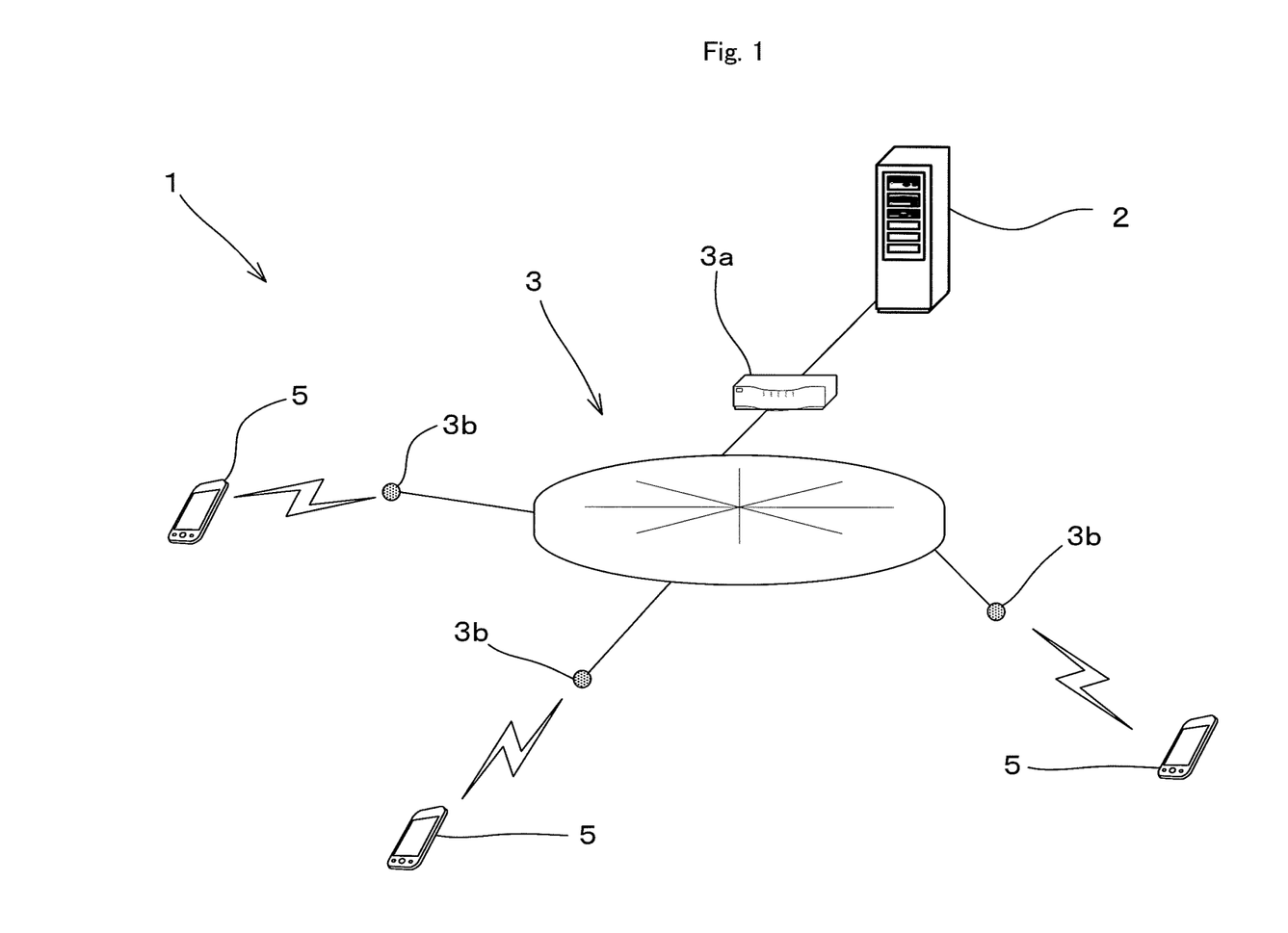
FIG. 1 is a figure showing a summary of the overall structure of a video distribution system according to an embodiment of the present invention.

A video distribution system according to an embodiment of the present invention will now be explained in the following. FIG. 1 is a figure showing a summary of the overall structure of the video distribution system according to an embodiment of the present invention. As shown in FIG. 1, the video distribution system 1 includes a central server 2, which functions as a server device. The central server 2 is not limited to being an example that is built from a single physical device. For example, a single logical central server 2 may be built from a server group that consists of a plurality of physical devices. Moreover, a logical central server 2 may be built by employing cloud computing.

User terminals 5 are connected to the central server 2 via a network 3. The user terminals 5 are types of network terminal device employed by users. For example, the user terminals 5 may function as requesting terminals that request web services to be described hereinafter to the central server 2 via the network 3. Moreover, for example, portable telephones (including smart phones) may be employed as the user terminals 5. Portable telephones are one type of user terminal via which applications are provided to individual users. For example, a portable telephone may have the function of replaying videos by displaying videos. Moreover, a portable telephone may provide functions of various other types by executing software. For example, a game machine function of enabling the user to play a game may be included in functions of this type. In other words, the user terminals 5 may function both as video display terminals and as game terminals. Incidentally, apart from the above, network terminal devices of various types that can be connected to the network and that are used by users individually may be employed as user terminals 5, such as, for example, personal computers or portable type tablet terminal devices.

As one example, the network 3 may be built by implementing network communication that employs the TCP/IP protocol. Typically, the network 3 is built as a combination of the internet that serves as a WAN and an intranet that serves as a LAN. In the example of FIG. 1, the central server 2 is connected to the network 3 via a router 3a, and each of the user terminals 5 is connected to the network 3 via an access point 3b.

Incidentally, the network 3 is not limited to being of a type that employs the TCP/IP protocol. Various formats that use cable circuits or wireless circuits or the like for communication (including infrared communication and Near Field communication and so on) may be employed for the network 3.

Via the network 3, the central server 2 provides web services of various kinds to the users of the user terminals 5. Such web services include a video distribution service for distributing videos to the user terminals 5. The details of the video distribution service will be described hereinafter.

Incidentally, the web services may include other services of various types corresponding to various functions of the user terminals 5. For example, the web services may include an information service for providing information of various kinds related to videos or to games. Moreover, for example, the web services may also include distribution services for distributing data or software of various kinds to the individual user terminals 5 (including data updates and so on). Furthermore, the web services may also include a community service of providing an information exchange forum for generation, exchange, and sharing of information by users, a service of providing IDs for identifying individual users, a matching service of matching users together when a plurality of users play a game in common via the network 3, and so on.

Figure 2:
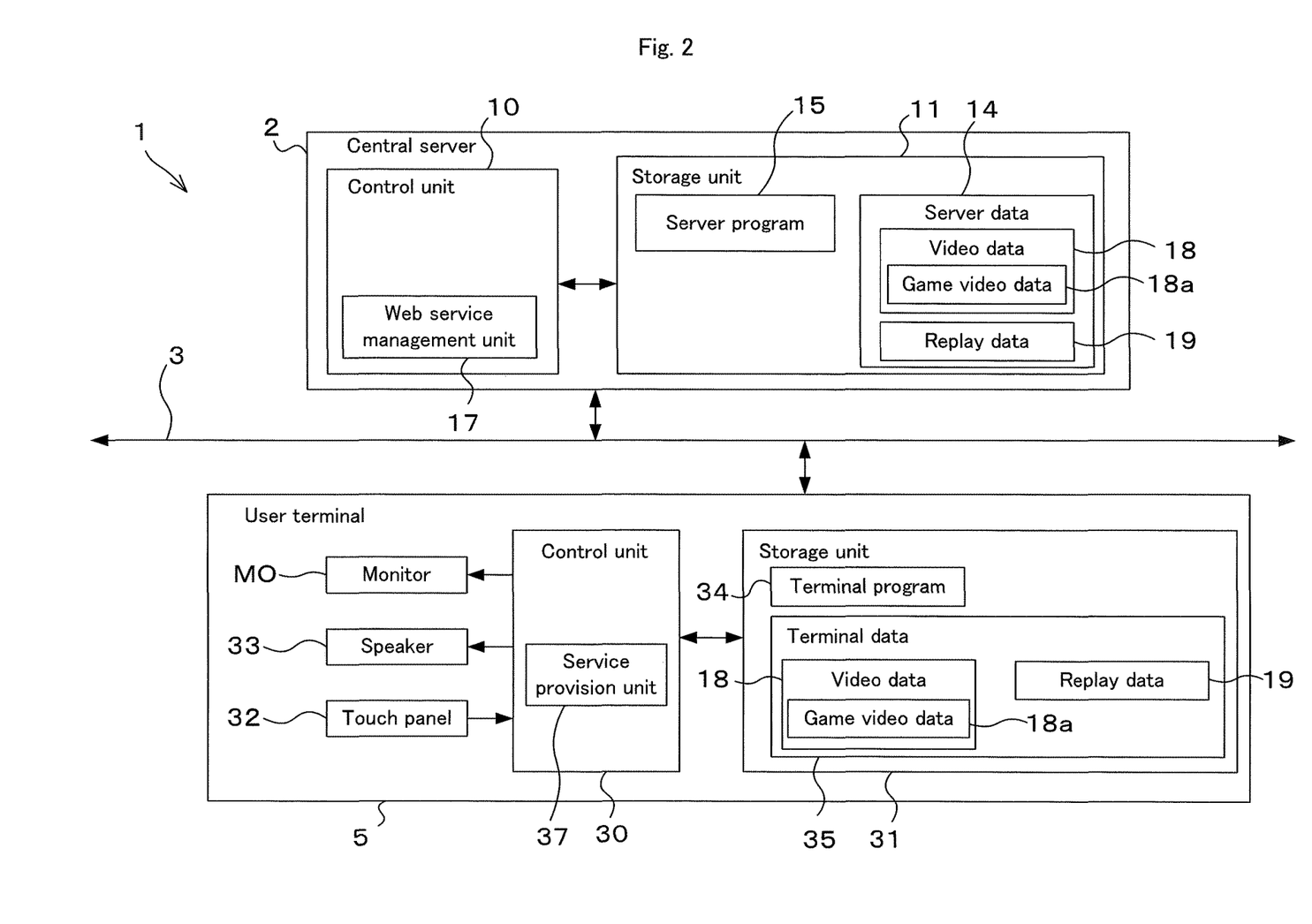
FIG. 2 is a figure showing the structure of principal portions of a control system of the video distribution system.

Next, principal portions of a control system of the video distribution system 1 for providing a game will be explained. FIG. 2 is a figure showing the structure of principal portions of the control system of the video distribution system 1. As shown in FIG. 2, the central server 2 includes a control unit 10 which serves as a computer, and a storage unit 11. The control unit 10 is built as a computer unit in which a microprocessor and various peripheral devices such as internal storage devices required for the operation of the microprocessor (like, for example, ROM and RAM) and so on are combined. Incidentally, input devices such as a keyboard and so on, and output devices such as a monitor and so on, may be connected to the control unit 10. However, these are not shown in the figures.

The storage unit 11 is connected to the control unit 10. The storage unit 11 may be adapted to be capable of maintaining storage even when power is not supplied; for example, it may be built around a high capacity storage medium such as a magnetic tape or the like. Server data 14 and a server program 15 are stored in the storage unit 11. The server program 15 is a computer program that is required for the central server 2 to provide services of various types to the user terminals 5. By the control unit 10 reading in and executing the server program 15, a web service management unit 17 is provided interior to the control unit 10.

The web service management unit 17 executes processing required for providing the web services mentioned above. The web service management unit 17 is a logical device that is implemented by a combination of computer hardware and a computer program. Incidentally, apart from the above, other logical devices of various types may also be provided internally to the control unit 10. However, these are not shown in the figures.

The server data 14 is data that is referred to as the server program 15 is executed. For example, the server data 14 may include video data 18 and replay data 19. Video data 18 is data for displaying video of various types. For example, the video data 18 may include game video data 18a for displaying a game video in which the playing of a game has been recorded. In more concrete terms, the game video data 18a may, for example, consist of data for displaying, as a video, game screen transitions during playing of a game from the past. Moreover, the replay data 19 is data for replaying play of a past game. For example, the replay data 19 may be employed by a user terminal 5 that has a game machine function. The replay data 19 will be described in detail hereinafter. Incidentally, apart from the above, the server data 14 may, for example, include data of various types for providing web services, such as ID management data for managing IDs of various types such as user IDs and so on. However, these are not shown in the figures.

On the other hand, each of the user terminals 5 is provided with a control unit 30, a storage unit 31, a monitor MO, a touch panel 32, and a speaker 33. The storage unit 31, the monitor MO, the touch panel 32, and the speaker 33 are all connected to the control unit 30. The control unit 30 is built as a computer unit in which a microprocessor and various peripheral devices such as internal storage devices required for the operation of the microprocessor (like, for example, ROM and RAM) and so on are combined. Incidentally, for example, apart from the above, devices of various types that are required for replaying videos or providing games or the like may be connected to the control unit 30. However, these are not shown in the figures.

The monitor MO is a per se known display device for displaying images and so on of various types on the basis of output signals from the control unit 30. As one example, according to output signals from the control unit 30, the monitor MO may display videos and game screens for playing games. The touch panel 32 is a per se known input device that, when touched by the user with a finger or the like, outputs a signal corresponding to the position of contact. For example, the touch panel 32 may be built to be transparent, and may be disposed so as to be overlaid upon the front surface of the monitor MO. And, for example, on the basis of touch operation by the user, the touch panel 32 may output a signal to the control unit 30 corresponding to the touched position. In a similar manner, the speaker 33 is a per se known output device (an audio reproduction device) for replaying audio of various types on the basis of output signals from the control unit 30. According to output signals from the control unit 30, the speaker 33 may, for example, replay audio of various types such as BGM (background music) and so on employed in videos or games.

On the other hand, the storage unit 31 may be built so as to be capable of maintaining storage even if power is not supplied, for example by a magnetic recording medium or an optical recording medium or a flash SSD (Solid State Drive) or the like. A terminal program 34 and terminal data 35 are stored in the storage unit 31. The terminal program 34 is a computer program required for the user terminal 5 to provide services of various types. For example, replaying of videos and provision of games may be included in this type of service. Along with execution of the terminal program 34, a service provision unit 37 is provided internally to the control unit 30. The service provision unit 37 executes processing of various types required for providing services, such as replaying of videos and playing of games and so on. The service provision unit 37 is a logical device that is implemented by a combination of computer hardware and a computer program. Incidentally, apart from the above, other logical devices of various types may also be provided internally to the control unit 30. However, these are not shown in the figures.

The terminal data 35 is data that is referred to while the terminal program 34 is executed. For example, the terminal data 35 may include video data 18 and replay data 19. Moreover, video data 18 may include game video data 18a. For example, at least a part of this data may be supplied from the central server 2, so that a required portion is included. Incidentally, apart from the above, the terminal data 35 may, for example, include data of various types for performing services of various types. For example, audio data such as BGM and so on for replaying audio of various types required for videos or games, image data for displaying images of various types required for games, and the ID management data described above, may be included in data of this type. However, these are not shown in the figures.

Next, the details of the video distribution service provided by the video distribution system 1 will be explained. As mentioned above, the video distribution service is a service for distributing videos to the user terminals 5. For example, a video that is to be distributed may be uploaded from a user terminal 5 to the central server 2 via the network 3. In other words, video data 18 for replaying a video that is to be distributed may be provided from a user terminal 5. And the video distribution service may include uploading of this type of video data 18. Furthermore, the video distribution service may also include uploading of replay data 19. And the video distribution service may include a service of distributing this kind of replay data 19 to a user terminal 5, so that play from the past is reproduced via the game machine function.

Figure 3:
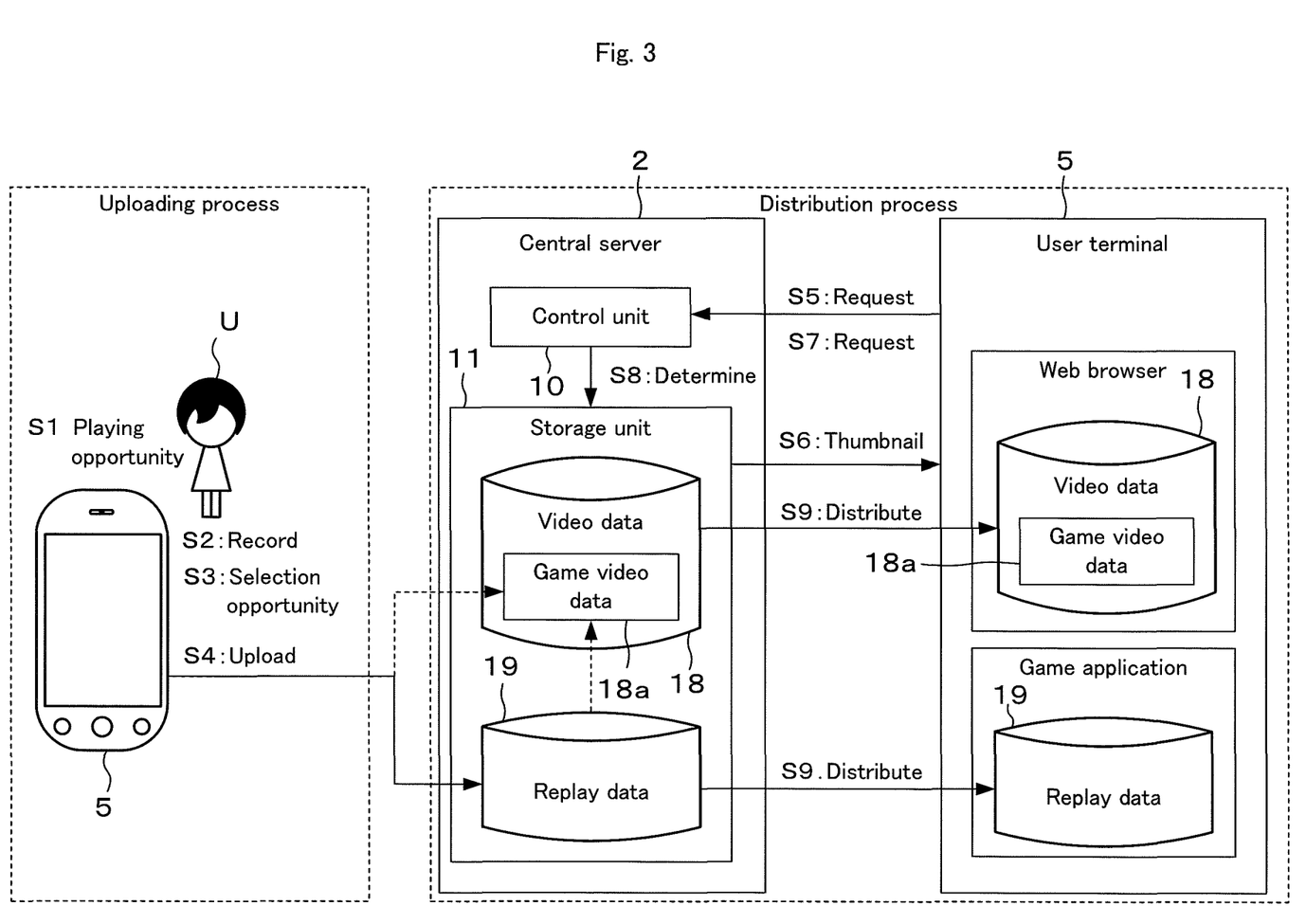
FIG. 3 is an explanatory figure for explanation of a summary of an example of a video distribution service.

FIG. 3 is an explanatory figure for explanation of a summary of an example of the video distribution service. As shown in FIG. 3, the video distribution service may, for example, include an uploading process and a distribution process. The uploading process is a process in which video data 18 or replay data 19 is uploaded by a user terminal 5 to the central server 2 via the network 3. On the other hand, the distribution process is a process in which video data 18 or replay data 19 is distributed by the central server 2 to a user terminal 5 via the network 3. For example, this type of distribution may be executed according to a request from a user terminal 5. In other words, in the distribution process, video data 18 or replay data 19 may be distributed according to a request from a user terminal 5, so that the user terminal 5 can execute replaying of video or reproduction of past play.

Furthermore, the example of FIG. 3 shows a summary of the video distribution service when the user terminal 5 has a video replay function and a game machine function, in other words when the user terminal 5 functions both as a video display terminal that is employed for displaying video and as a game terminal that supplies a game. In this case, as shown in FIG. 3, in the uploading process, for example, first the user terminal 5 may provide a playing opportunity to the user U for playing the game (S1). For example, the user terminal 5 may provide a playing opportunity of this type via a dedicated game application (i.e. software). In other words, the user terminal 5 may provide the game via a game application of this type (sometimes this is termed a "game application"). Moreover, for example, a game application of this type may also be provided by the central server 2 via the distribution service.

Moreover, for example, the user terminal 5 may record the state of play of a game while it is being played by the user U (S2). To put this in another manner, while the user U is playing, the user terminal 5 may generate replay data 19 corresponding to this playing. This type of generation of replay data 19 may, for example, be performed via the game application described above. In concrete terms, the game application described above may be adapted, by appropriately recording required information while the user is playing, to generate replay data 19 automatically in parallel with the progress of playing. In other words, the game application may be adapted automatically to generate replay data 19 for later reproducing the play of the game that is currently underway. Moreover, the replay data 19 may be structured as data dedicated for this game application. In other words, the replay data 19 may be adapted to reproduce the play of the game, only when employed via the game application.

Incidentally, the game application may also be adapted to record video corresponding to the game that is being played. In concrete terms, by recording transitions of the game screen of the game being played, the game application may be adapted further to generate game video data 18a for displaying video corresponding to this play. In other words, the game application may be adapted to generate both replay data 19 for reproducing the play of the game being played, and also game video data 18a for displaying video corresponding to this play (in the following, sometimes this is termed "game video").

Furthermore, for example, the user terminal 5 may provide a selection opportunity to the user U for selecting whether or not to upload the replay data 19 (S3). For example, this type of selection opportunity may be provided by the game application, in a similar manner to the playing opportunity. In concrete terms, for example, when the playing of the game has ended, the game application may provide a selection opportunity for selecting whether or not to upload the replay data 19 (for example, the game application may display a selection button for selecting whether or not to perform uploading). And the user terminal 5 may upload the replay data 19 if uploading has been selected here (S4).

Incidentally, this type of uploading may also be performed repeatedly according to the progression of the game. In this case, the selection opportunity may be omitted, or may be provided before playing. Moreover, if the game application generates game video data 18a corresponding to a game video, then this game video data 18a may also be uploaded as well, together with the replay data 19. Or, game video data 18a corresponding to the game video may be generated by the central server 2 on the basis of the replay data 19. Such generation of the game video data 18a may be performed at the time of uploading, or may be performed at the time of distribution. In other words, as one example, the video distribution service may be provided so that the video data 18 necessarily includes the game video data 18a corresponding to the replay data 19.

On the other hand, the distribution process may be provided on the basis of a request from a user terminal 5. In concrete terms, for example, first, a user terminal 5 may request (S5) the central server 2 to provide the video distribution service on the basis of a user command (this may be the same user U as the supplier of the replay data 19 or the like, or may be a different user). This request may also, for example, be performed via the game application described above. Or, if the user terminal 5 has some other application for replaying video, then the request may be performed via this other application. For example, a web browser application (hereinafter sometimes termed a "web browser") may be employed as such another application. For example, a web browser may be built as an application for browsing various websites. In other words, in this case, the video distribution service may be provided via a website.

When a request arrives from a user terminal 5, for example if the video data 18 corresponds to a plurality of videos, then the central server 2 may provide a list based upon thumbnails (i.e. a reduced image of each video) of the data to be distributed to the user terminal 5 (S6). In concrete terms, if for example the video data 18 always includes game video data 18a corresponding to the replay data 19, then the central server 2 may provide a list to the user terminal 5 based upon thumbnails that take the plurality of videos reproduced according to the video data 18 as subjects. And, when the user has performed a selection of a thumbnail, the user terminal 5 may request the central server 2 to distribute video according to the selection result (S7).

On the other hand, the central server 2 may determine the data for distribution to be provided to the user terminal 5 on the basis of a request from the user terminal 5 (S8). For example, on the one hand, if the user terminal 5 is functioning as a game terminal, then this determination may be executed by specifying the replay data 19 as data to be distributed preferentially; while, if the user terminal 5 is functioning as a video display terminal, then this determination may be executed by specifying the video data 18 as data to be distributed. In other words, the specification of the data to be distributed may be performed according to the function of the recipient user terminal 5. In concrete terms, for example, when, in response to a request that specifies a game video as a subject to be distributed, the user terminal 5 makes a request via a game application, then the central server 2 may specify replay data 19 as the data to be distributed. On the other hand if, in response to a similar request, the user terminal 5 is executing the request via a web browser, then the replay data 19 cannot be used by the web browser, so that the game video data 18a is specified as the data to be distributed. In this manner, for example, the central server 2 may determine which of the replay data 19 and the game video data 18a is to be the data to be distributed, by specifying the data that can be employed according to the type (i.e. the function) of the user terminal 5, i.e. according to whether the recipient user terminal 5 is functioning as a video display terminal or is functioning as a game terminal, and by preferentially specifying the replay data 19 if it is possible to employ both types of data.

Next, in response to the request, the central server 2 may distribute the replay data 19 or the video data 18 to the user terminal 5 (S9). As one example, the distribution processing may be provided according to this type of flow. And the video distribution service may be implemented via this type of uploading process and this type of distribution process. In this case, the video data 18 functions as the data for distribution of the present invention when the user terminal 5 functions as a video display terminal, and the replay data 19 functions as the data for distribution of the present invention when the user terminal 5 functions as a game terminal.

Next, the difference between reproduction of past play based upon replay data 19 and reproduction of a game video based upon game video data 18a will be explained with reference to FIGS. 4 and 5. Replaying on the basis of replay data 19 (sometimes subsequently referred to as "replay video") is a type of video that has much in common with game video, in the sense that the image moves (due to this, the replay data 19 may also be made to function as part of the video data 18). On the other hand, for example, in relation to the size of an object appearing in the video and its angle of display (for example, the angle subtended between the viewpoint or the line of sight of a virtual camera for performing video photography and the object of interest), while with a game video, in the same way as with a normal video, these generally cannot be modified, with a replay video these may be modified. In other words, while with a game video the size of the object and the display angle are displayed fixedly just as they were when they were recorded, with a replay video these may be changed according to the user's selection. In concrete terms, for example, with a replay video, the angle of view of the virtual camera for performing video photography may be changed so as to magnify or shrink the object. Or, the point of view of this type of virtual camera may be changed so as to change the display angle of the object (the position of the point of view or the line of sight could also be changed). And a game video and a replay video differ according to whether or not this kind of change (modification) is possible.

Figure 4:
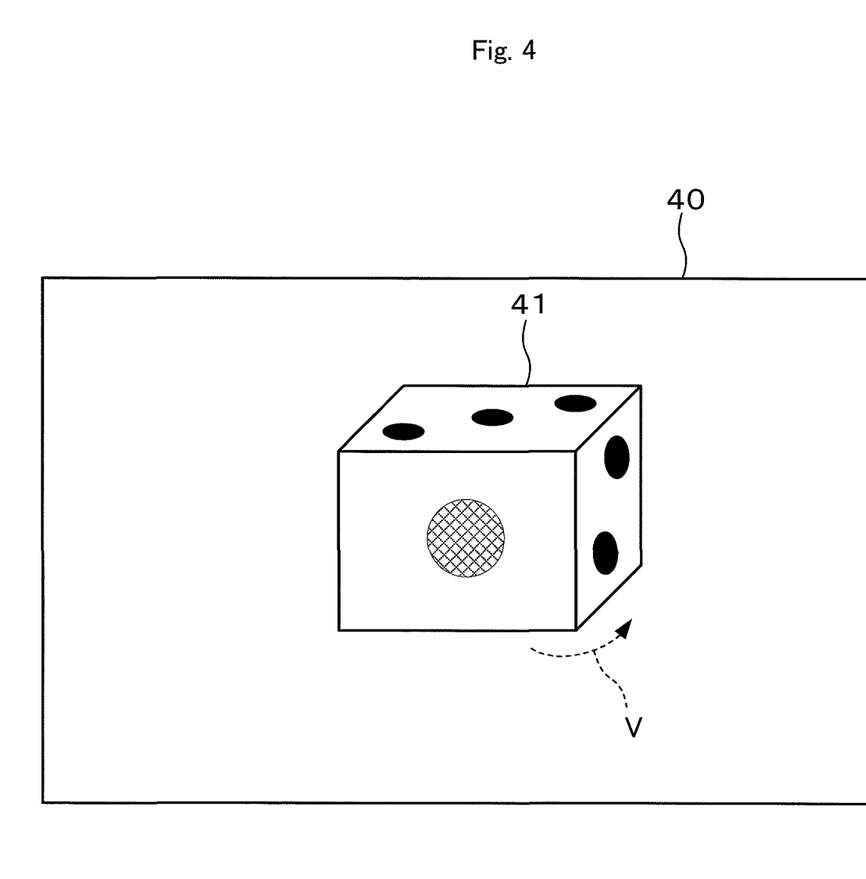
FIG. 4 is a figure schematically showing an example of a video screen displaying one scene in a replay video that is common to a game video.

FIG. 4 is a view schematically showing an example of a video screen displaying one scene in a replay video that is common to a game video. As shown in FIG. 4, for example, the video screen may include an object 41. For example, if the game is played in a game space (a game screen) corresponding to a virtual three-dimensional space, the object 41 may be structured three-dimensionally so as to correspond to the game space. In other words, the object 41 may be built so that its shape and/or its information are different, depending upon the viewing direction (i.e. the viewing angle). In the example of FIG. 4, an image of a three-dimensional die is displayed as the object 41. Moreover, "1", "2", and "3" are displayed upon the front side, the rightward side, and the upward side of the object 41 respectively. In this case, the object 41 is also displayed in the same orientation in the game video corresponding to this replay video.

Figure 5:
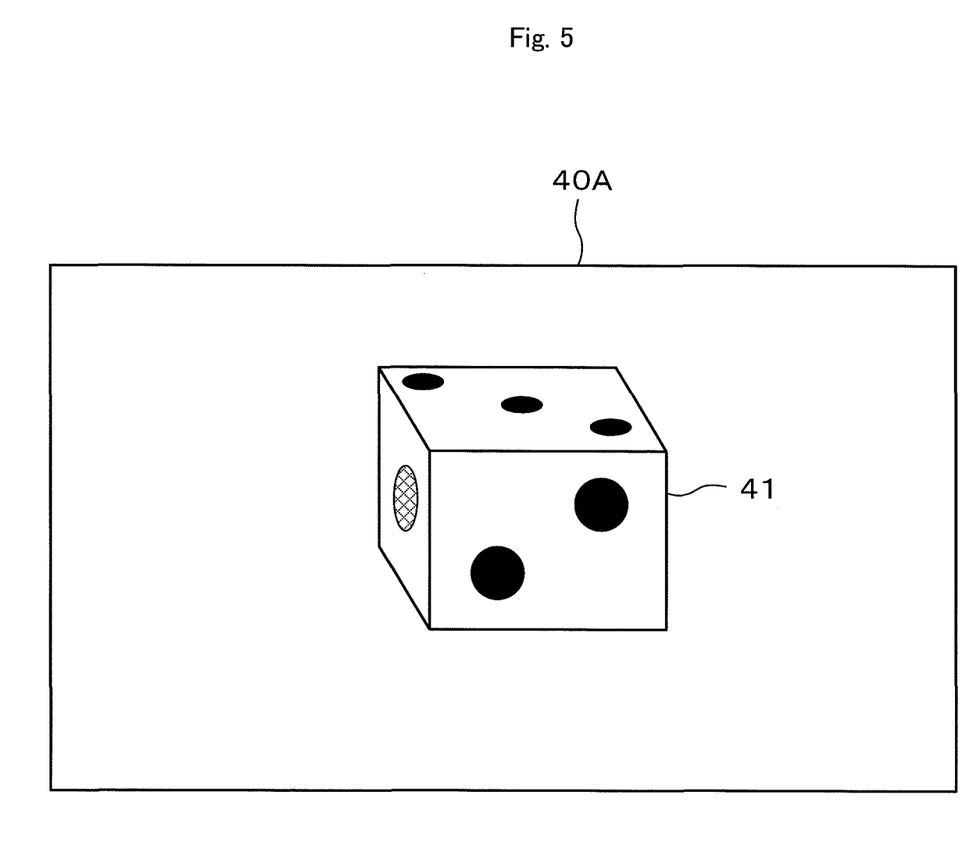
FIG. 5 is a figure schematically showing a video screen after change, when the point of view of the video screen of the FIG. 4 example has been rotated in a direction shown by a broken line arrow V.

On the other hand, FIG. 5 is a figure schematically showing a video screen 40 after change, when the point of view (i.e. the position of the virtual camera) of the video screen 40 of the FIG. 4 example has been rotated in a direction shown by a broken line arrow V. In this case, as shown in FIG. 5, the orientation (i.e. the direction) of the object 41 is changed as compared with the example of FIG. 4, along with the rightward rotation of the point of view corresponding to the broken line arrow V. In concrete terms, the example of FIG. 5 shows a case in which the position of the virtual camera (i.e. its point of view) has been changed from being in front of the surface on which "1" is displayed to being in front of the surface on which "2" is displayed. Due to this, in the FIG. 5 example, the object 41 is displayed so that "1", "2", and "3" are displayed upon the leftward side, the front side, and the upward side of the object 41 respectively. In other words, while the direction of the surface upon which "3" is displayed is not changed, the direction of the surface upon which "1" is displayed is changed from the front side to the leftward side, and the direction of the surface upon which "2" is displayed is changed from the rightward side to the front side. Furthermore, although the game video includes the video screen 40, it does not include the video screen 40A after this type of change. Due to this, an object having this type of orientation cannot be viewed in a game video. In a similar manner, in a replay video, the point of view can be changed to any desired position according to selection by the user (for example, by touch actuation upon the touch panel 32 in order to specify a direction of rotation). In other words, according to selection by the user, a replay video may reproduce play from the past with any desired point of view, so as to display the object 41 from any desired direction. As one example, this type of difference (whether modification is possible or not) may be identified between a replay video and a game video.

Figure 6:
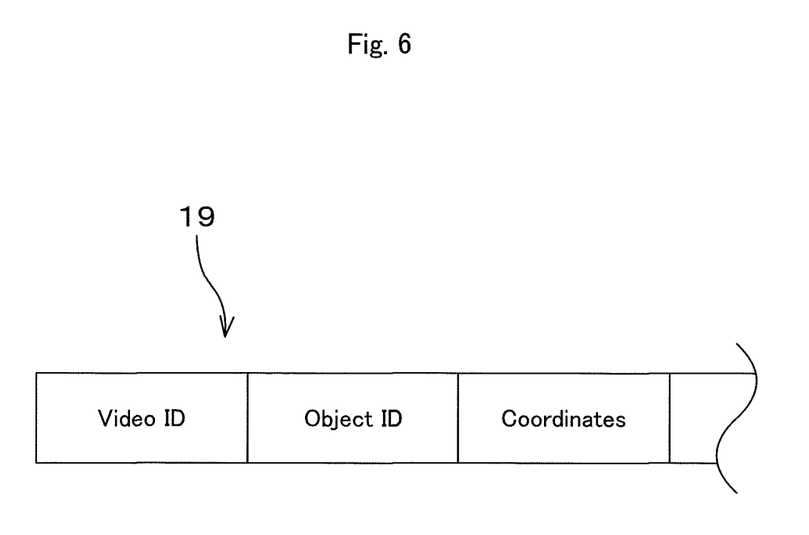
FIG. 6 is an explanatory figure for explanation of an example of contents of replay data.

Next, the details of the replay data 19 will be explained. As described above, the replay data 19 is data for replaying play of a past game upon the user terminal 5. FIG. 6 is an explanatory figure for explanation of an example of the contents of replay data 19. As shown in FIG. 6, for example, the replay data 19 may include the information items "video ID", "object ID", and "coordinates". And, for example, the replay data 19 may be configured as a set of records in which these items of information are associated in mutual correspondence.

"Video ID" is information for identifying the video to be replayed. For example, information specifying a unique video ID for each video to be replayed (this may also include game videos) may be employed as "video ID". "Object ID" is information for identifying objects (such as persons, things, and so on) that appear in the game. For example, information specifying a unique object ID for each object may be employed as "object ID". And information specifying an object ID of an object that appears (i.e. is displayed) in the video to be replayed that corresponds to the "video ID" may be described as "object ID". Moreover, "coordinates" is information specifying coordinates of objects in the game space (i.e., the game screen) for playing the game. "Coordinates" may, for example, be employed for specifying the positions of objects in the game space, in order to display such objects from any desired angles.

Next, data acquisition processing and data distribution processing will be explained. Data acquisition processing is processing for acquiring replay data 19 from the user terminals 5. For example, data acquisition processing may be executed in order to implement uploading (S4) of replay data in the uploading processing of the FIG. 3 example. Moreover, data distribution processing is processing for distributing replay data 19 to the user terminals 5. For example, data distribution processing may be executed in order to implement the processes of S6 through S9 in the distribution processing of the FIG. 3 example.

Figure 7:
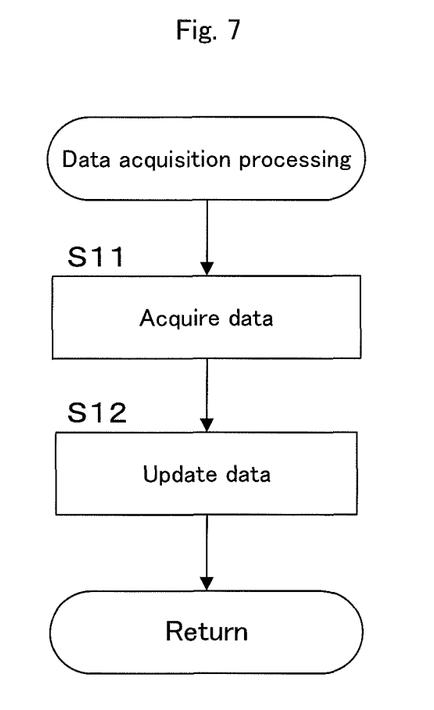
FIG. 7 is a figure showing an example of a flow chart of a data acquisition processing routine.
Figure 8:
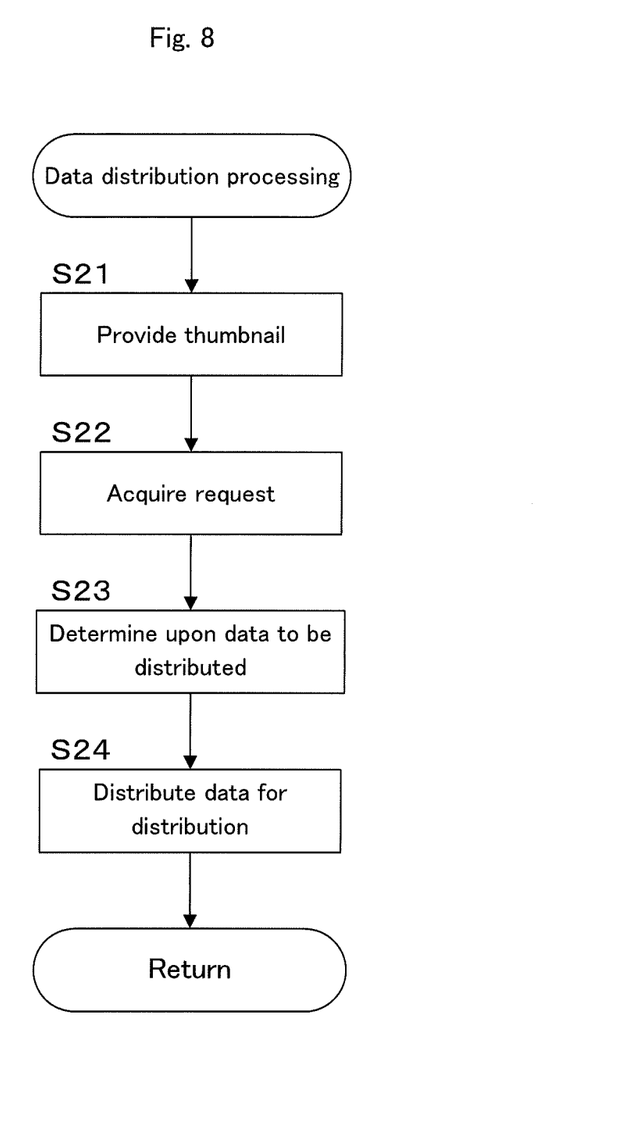
FIG. 8 is a figure showing an example of a flow chart of a data distribution processing routine.

For example, the data acquisition processing may be implemented by the control unit 10 of the central server 2 via the routine of FIG. 7, and the data distribution processing may be implemented by the control unit 10 of the central server 2 via the routine of FIG. 8. In more concrete terms, for example, the routines of FIGS. 7 and 8 may, as one example, be executed via the web service management unit 17 of the control unit 10. Incidentally, apart from the processing mentioned above, the control unit 10 of the central server 2 and the control units 30 of the user terminals 5 may also execute per se known processing of various types and so on, either single or in mutual cooperation. However, detailed explanation thereof is omitted.

FIG. 7 is a figure showing an example of a flow chart of a data acquisition processing routine for implementing data acquisition processing. The routine of FIG. 7 may, for example, be executed each time replay data 19 is transmitted from a user terminal 5, together with selection of uploading in a selection opportunity (S3).

When the routine of FIG. 7 is started, first in step S11 the web service management unit 17 acquires replay data 19 from the user terminal 5. Moreover, for example, if game video data 18a corresponding to the replay data 19 is generated by the user terminal 5, then the web service management unit 17 may also acquire this game video data 18a in step S11. On the other hand, if this type of game video data 18a is not generated by the user terminal 5, then the web service management unit 17 may generate this sort of game video data 18a in step S11. In concrete terms, for example, the web service management unit 17 may generate this type of game video data 18a on the basis of the replay data 19 that has been acquired.

Next in step S12 the web service management unit 17 updates the content of the replay data 19. In concrete terms, for example, the web service management unit 17 may update the content of the replay data 19 stored in the storage unit 11, so that the content of the replay data acquired in step S11 is reflected in the content of the existing replay data 19. In a similar manner, if game video data 18a has been acquired in step S11 (including both the case when it is acquired from a user terminal 5 and the case when it is acquired on the basis of being generated), then the web service management unit 17 may update the content of the video data 18 so that this type of game video data 18a is included. For example, if the video data 18 includes a plurality of sets of video data 18 respectively corresponding to a plurality of videos, then the web service management unit 17 may implement this type of updating by adding the video data 18 acquired in step S11. In other words, this type of updating may be implemented by adding the video data 18 corresponding to the new video. The same also applies to the replay data 19. In other words, if the replay data 19 includes a plurality of sets of replay data 19 respectively corresponding to a plurality of replay videos, then the web service management unit 17 may implement this type of updating by adding the replay data 19 acquired in step S11. And, when the processing of step S12 is completed, the web service management unit 17 ends this cycle of the routine. Due to this, the replay data 19 of the game played by the user U of the user terminal 5 and the game video data 18a corresponding thereto are acquired, and the content thereof is reflected in the replay data 19 and the video data 18 that already exist, respectively. In more concrete terms, for example, the processing of S4 in the example of FIG. 3 is implemented.

On the other hand, FIG. 8 is a figure showing an example of a flow chart of a data distribution processing routine for implementing data distribution processing. The routine of FIG. 8 may, for example, be executed each time provision of the video distribution service is requested (S5).

When the routine of FIG. 8 is started, first in step S21 the web service management unit 17 provides thumbnails to the user terminal 5. In concrete terms, for example, if the video data 18 always includes game video data 18a, then the web service management unit 17 may distribute data for displaying thumbnails of this type to the user terminal 5, so that a list of thumbnails of videos reproduced by the video data 18 (including game videos and other videos) is displayed upon the user terminal 5.

In the next step S22, the web service management unit 17 acquires a request from a user terminal 5. In concrete terms, for example, the web service management unit 17 may acquire, as a request, the result of selection among the thumbnails provided in step S21. In other words, the web service management unit 17 may for example acquire, from a user terminal 5, as a request, information about a video that has been selected from the thumbnails as a subject for distribution.

In the next step S23, the web service management unit 17 determines upon data to be distributed. For example, the web service management unit 17 may perform this determination on the basis of the function (for example, the application) of the user terminal that is the source of the request. In concrete terms, in response to a request to make a game video the subject of distribution, if, for example, the request by the user terminal 5 has been made from a game application, then the web service management unit 17 may specify replay data 19 as the data to be distributed; while, if the request has been made from a web browser, then the web service management unit 17 may specify game video data 18a as the data to be distributed. On the other hand if, for example, a video other than a game video is requested as the subject for distribution, then, since there is no replay data 19 corresponding to this type of video, accordingly the web service management unit 17 may specify the video data 18 corresponding to the video as the data to be distributed.

In the next step S24, the web service management unit 17 distributes the data for distribution that has been determined upon in step S23. In concrete terms, for example, if in step S23 replay data 19 has been specified as the subject for distribution, then the web service management unit 17 may distribute the replay data 19 as the subject for distribution; while, if video data 18 (including game video data 18a) has been specified as the subject for distribution, then the web service management unit 17 may distribute the video data 18 as the subject for distribution. And, when the processing of step S24 is completed, the web service management unit 17 ends this cycle of the routine.

By the routine of FIG. 8, the data to be distributed is determined according to the function of the user terminal 5, and is provided to the user terminal 5. In concrete terms, when for example a video distribution service is requested via a game application, among the replay data 19 and the video data 18, the replay data 19 is preferentially distributed to the user terminal 5. On the other hand, when a video distribution service is requested via a web browser, video data 18 is specified as the subject for distribution, and is distributed.

As explained above, according to this embodiment, in the video distribution service, both replay data 19 and video data 18 are employed as data to be distributed. On the other hand, replay data 19 is data for reproducing play from the past in the game application. In other words, if the game application is not being used, then past play will not be reproduced even if it is downloaded to the user terminal 5. Due to this, if there is a request for distribution via a game application, in other words, if there is a distribution request from a user terminal 5 that functions as a game terminal 5, then, among the replay data 19 and the video data 18, the replay data 19 is preferentially specified and distributed. On the other hand, if for example there is a distribution request via an application other than a game application, such as a web browser or the like, in other words if there is a distribution request from a user terminal 5 that functions as a video display terminal, then the video data 18 is specified and distributed. In other words, according to the function of the user terminal 5, appropriate data is determined and is distributed that can be employed by the user terminal 5. Due to this, it is possible appropriately to distribute both the video data 18 and the replay data 19. As a result, when the replay data 19 is distributed, it is possible to convey to the user, via the replay data 19, a state of play that cannot be expressed only by a game video.

In concrete terms, since play from the past is reproduced with a replay video that is based upon the replay data 19, accordingly information is included that is not displayed in the game video. For example, if the replay video is adapted to enable enlargement or reduction of an object 41, then it is possible to display another object or the like that is not displayed without being enlarged or reduced (for example a small object or one that is not included in the display range if not reduced in size). Or if, for example, the replay video is adapted to enable changing of the point of view of the virtual camera, then past play can be reproduced from various different points of view. Since, due to this, it is possible to display the object in various different orientations, accordingly it is possible, for example, to provide information that is only included in views from other angles (i.e. orientations). In other words, it is possible to express states of play that cannot be expressed only from one point of view. Since, with these arrangements, it is possible to endow the game with an appeal that cannot be conveyed with only the game video, accordingly it is possible further to promote the use of the game.

In the embodiment described above, by executing the routine of FIG. 7, the control unit 10 of the central server 2 functions as the data acquisition unit and the data updating unit of the present invention. Moreover, by executing the routine of FIG. 8, the control unit 10 of the central server 2 functions as the subject determination unit of the present invention. Furthermore, by storing the video data 18 and the replay data 19, the storage unit 11 of the central server 2 functions as the data storage unit of the present invention.

The present invention is not limited to the embodiment described above; it may be varied as appropriate. For example, in the embodiment described above, the user terminals 5 function both as video display terminals and as game terminals, according to differences in their software. However, the present invention is not limited to this type of form. For example, the user terminals 5 may be adapted to function as video display terminals or as game terminals, according to differences in their hardware. In other words, for example, it would be possible for two user terminals 5 that are embodied as a personal computer and as a tablet to function respectively as a video display terminal and as a game terminal. Furthermore, for example, in addition to the user terminals 5, commercial game machines (for business use) that enable users to play games in a predetermined range for payment or for free may be connected to the central server 2 via the network 3 as game terminals. Moreover, in this case, this type of game machine may also be employed as a dedicated game terminal.

In the following, examples of the present invention are described that are obtained from the details described above. Incidentally, in order to facilitate understanding of the present invention, reference symbols in parentheses that refer to the appended figures are supplemented in the following explanation, but the present invention is not thereby to be considered as being limited to the embodiments shown in the figures.

The server device of the present invention is a server device (2) that comprises a computer having a data storage unit storing data for distribution (18, 19) to be distributed to a requesting terminal (5) connected via a network (3), and that distributes the data for distribution to the requesting terminal in response to a request from the requesting terminal, and wherein the computer serves as: a data acquisition unit (10) that, when the requesting terminal includes a game terminal (5) that provides a game, acquires from the game terminal replay data (19) for reproducing past play of the game upon the game terminal, so that the replay data (19) functions as the data for distribution; a data updating unit (10) that, when the requesting terminal includes a video display terminal (5) that is employed for displaying videos so that the video data (18) for displaying the videos functions as the data for distribution, updates the video data so as to include game video data (18*a*) for displaying a game video corresponding to the past play; and a subject determination unit (10) that determines a subject for distribution from among the replay data and the video data in accordance with the type of the requesting terminal, so that the replay data is distributed to the game terminal and the video data is distributed to the video display terminal, respectively.

According to the present invention, if a game terminal and a video display terminal function as the requesting terminal (s), then both replay data and video data are employed as data for distribution. On the other hand, the reply data is data for reproducing play from the past upon a game terminal. Due to this, if a game terminal functions as the requesting terminal, then replay data is specified and is distributed as being the subject for distribution; while, if a video display terminal functions as the requesting terminal, then video data is specified and is distributed as the subject for distribution. In other words, appropriate data is determined and is distributed in accordance with the type of the requesting terminal. Due to this, both video data and replay data can be appropriately distributed. As a result, when a request is received from a game terminal, it is possible to convey a state of play to the user via replay data, which cannot be expressed only with a game video. Since, due to this, it is possible to endow the game with an appeal that cannot be conveyed only with a game video, accordingly it is possible further to promote the usage of the game.

Moreover, the replay data may be structured in various different ways, provided that it is possible to reproduce past play. For example, in one aspect of the server device of the present invention, if the game includes a three dimensional object (41), then the replay data may include coordinate information for the object in the past play, so that the past play is reproduced upon the game terminal with a point of view corresponding to selection by the user, by displaying the object from a direction corresponding to selection by the user. In this case, since the play from the past is reproduced from various different points of view via the replay data, accordingly it is possible to express a state of play that cannot be expressed with only one point of view.

Furthermore, the game video data may be acquired in various different ways for updating of the video data. For example, in one aspect of the server device of the present invention, if the game terminal generates the game video data, then the data acquisition unit may further acquire the game video data from the game terminal; and the data updating unit may update the video data on the basis of the result of acquisition by the data acquisition unit. Or, the data updating unit may update the video data by generating the video data on the basis of the replay data.

On the other hand, a non-transitory computer readable storage medium according to the present invention is a non-transitory computer readable storage medium storing a computer program that is adapted to cause the computer having the data storage unit to function as units of the server device described above. By executing the computer program of the present invention, it is possible to implement the server device of the present invention.

The invention claimed is:

1. A server device that comprises a computer having a data storage unit storing data for distribution to be distributed to a requesting terminal connected via a network, and that distributes the data for distribution to the requesting terminal in response to a request from the requesting terminal, and wherein the computer serves as:

a data acquisition unit that, when the requesting terminal includes a game terminal that provides a game, acquires from the game terminal replay data for reproducing past play of the game upon the game terminal, so that the replay data functions as the data for distribution;

a data updating unit that, when the requesting terminal includes a video display terminal that is employed for displaying videos so that video data for displaying the videos functions as the data for distribution, updates the video data so as to include game video data for displaying a game video corresponding to the past play; and a subject determination unit that determines a subject for distribution from among the replay data and the video data in accordance with a type of the requesting terminal, so that the replay data is distributed to the game terminal and the video data is distributed to the video display terminal, respectively, and wherein the subject determination unit determines, when both of the replay data and the video data corresponding to the replay data are available by the game terminal also functioning as the video display terminal, the subject for distribution so that the replay data is distributed to the game terminal with priority over the video data.

2. The server device according to claim 1, wherein, if the game includes a three dimensional object, the replay data includes coordinate information for the three dimensional object in the past play, so that the past play is reproduced upon the game terminal with a point of view selected by a user, by displaying the three dimensional object from a direction corresponding to selection by the user.

3. The server device according to claim 1, wherein:

if the game terminal generates the game video data, the data acquisition unit further acquires the game video data from the game terminal; and the data updating unit updates the video data on the basis of a result of acquisition by the data acquisition unit.

4. The server device according to claim 1, wherein the data updating unit updates the video data by generating the video data on the basis of the replay data.

5. A non-transitory computer readable storage medium storing a computer program that is adapted to cause the computer having the data storage unit to function as units of the server device according to claim 1.

* * * * *